United States Patent [19]
Ueda et al.

[11] Patent Number: 5,148,678
[45] Date of Patent: Sep. 22, 1992

[54] EXHAUST GAS FLOW CONTROL VALVE FOR INTERNAL COMBUSTION ENGINE

[75] Inventors: Hironori Ueda; Kazumichi Hanai; Hitoshi Takeuchi; Kazutaka Nakamichi; Takashi Kubota, all of Obu, Japan

[73] Assignee: Aisan Kogyo Kabushiki Kaisha, Obu, Japan

[21] Appl. No.: 631,304

[22] Filed: Dec. 20, 1990

[30] Foreign Application Priority Data

Dec. 26, 1989 [JP] Japan ............................ 1-150390[U]
Sep. 7, 1990 [JP] Japan ................................. 2-238435
Oct. 24, 1990 [JP] Japan ................................. 2-286709

[51] Int. Cl.$^5$ ....................... F02B 37/12; F16K 49/00
[52] U.S. Cl. ..................................... 60/602; 92/144; 137/338; 137/340; 137/375
[58] Field of Search ............................ 60/602; 92/144; 137/338, 340, 375; 251/58, 61

[56] References Cited

U.S. PATENT DOCUMENTS

| | | | |
|---|---|---|---|
| 3,253,611 | 5/1966 | Cummins | 137/338 |
| 3,857,406 | 12/1974 | Darling | 137/375 |
| 4,403,538 | 9/1983 | Rise | 60/602 X |
| 4,655,040 | 4/1987 | Parker | 60/602 |
| 4,730,456 | 3/1988 | Tadekuro et al. | 62/602 |

FOREIGN PATENT DOCUMENTS

| | | | |
|---|---|---|---|
| 3009453 | 9/1981 | Fed. Rep. of Germany | 60/602 |
| 110821 | 7/1983 | Japan | 60/602 |

*Primary Examiner*—Michael Koczo
*Attorney, Agent, or Firm*—Armstrong, Nikaido, Marmelstein, Kubovcik & Murray

[57] ABSTRACT

An exhaust gas flow control valve for an internal combustion engine comprises a body, a diaphragm actuator and a bracket. The body is equipped with an exhaust passage and a valve member arranged in the exhaust passage. The bracket is equipped with an actuator mounting seat for mounting the diaphragm actuator and a body mounting seat connected to the body. The diaphragm actuator is equipped with a casing connected to the actuator mounting seat of the bracket, a diaphragm cased in the casing and a rod protruding from the diaphragm and out of the casing for actuating the valve member in accordance with the action of the diaphragm. Between the actuator mounting seat of the bracket and the diaphragm of the diaphragm actuator, moreover, there is formed an insulating layer for insulating the heat to be transferred to the diaphragm.

8 Claims, 10 Drawing Sheets

EXHAUST GAS FLOW CONTROL VALVE FOR INTERNAL COMBUSTION ENGINE

BACKGROUND OF THE INVENTION

1. Field of the Invention

The present invention relates to an exhaust gas flow control valve for an internal combustion engine. The flow control valve according to the present invention is arranged in the exhaust pipe of the internal combustion engine. Moreover, this flow control valve adjusts the flow rate of exhaust gases so as to control numbers of turning revolutions of a turbocharger arranged at the upstream position of exhaust gas flow.

2. Description of the Prior Art

Figure 1:
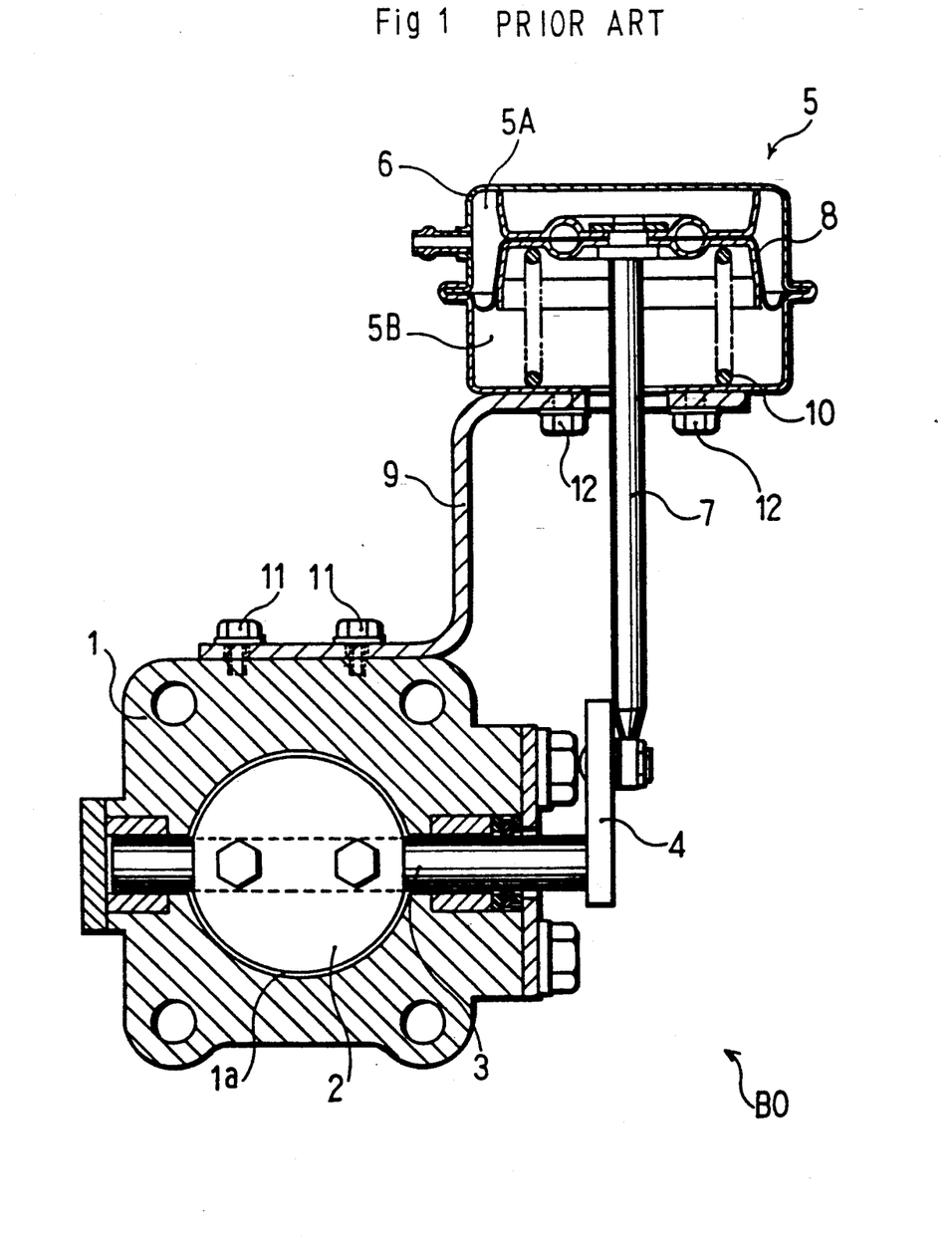
FIG. 1 is a section showing the example of the prior art.

In the prior art, an exhaust gas flow control valve B0 of this kind is equipped, as shown in FIG. 1, with a body 1, a diaphragm actuator 5 and a bracket 9.

The body 1 is arranged in the not-shown exhaust pipe. On the other hand, the body 1 is formed with an exhaust passage 1a. A valve member 2 is arranged in the exhaust passage 1a. The body 1 supports a valve shaft 3. This valve shaft 3 has its one end connected to an arm 4. This arm 4 is connected to the rod 7 of the diaphragm actuator 5 by means of a pin (although not shown) (as disclosed in Japanese Utility Model Laid-Open No. 55-106342).

The diaphragm actuator (as will be shortly referred to as the "actuator") 5 has a casing 6. In this casing 6, there is arranged a diaphragm 8 which partitions the inside of the casing 6 into two chambers.

The lower chamber 5B of the casing 6 is vented to the atmosphere. On the other hand, the upper chamber 5A of the casing 6 is connected with a not-shown pressure source. This pressure source boosts the internal pressure of the upper chamber 5A when the accelerator pedal is depressed. Moreover, the pressure source moves the rod 7 downward together with the diaphragm 8. Reference numeral 10 designates a coil spring.

In this flow control valve B0, moreover, the bracket 9 holds the casing 6 of the actuator 5. The bracket 9 is connected and fixed to the body 1 by means of bolts 11. Numeral 12 designates bolts to be used when the bracket 9 fixed in the casing 6.

In this flow control valve B0, the internal pressure of the upper chamber 5A of the actuator 5 is dropped if the not-shown accelerator pedal is released Then, the rod 7 is moved upward together with the diaphragm 8 by the urging force of the coil spring 10. And, the valve shaft 3 is rotated by the arm 4. As a result, the valve member 2 closes the exhaust passage 1a. Thus, this flow control valve B0 adjusts the flow rate of exhaust gases.

In the flow control valve B0 of the prior art, however, the heat resistance of the diaphragm 8 of the actuator 5 is low (at about 200° C. or lower). This makes it necessary to prevent the heat of the body 1 from being transferred through the bracket 9 to the diaphragm 8.

For this necessity in the prior art, the bracket 9 is connected and fixed to a cold portion of the body 1. This reduces the degree of freedom for arranging the bracket 9 in the body 1. As a result, the degree of freedom for mounting the flow control valve B0 in the internal combustion engine.

Figure 2:
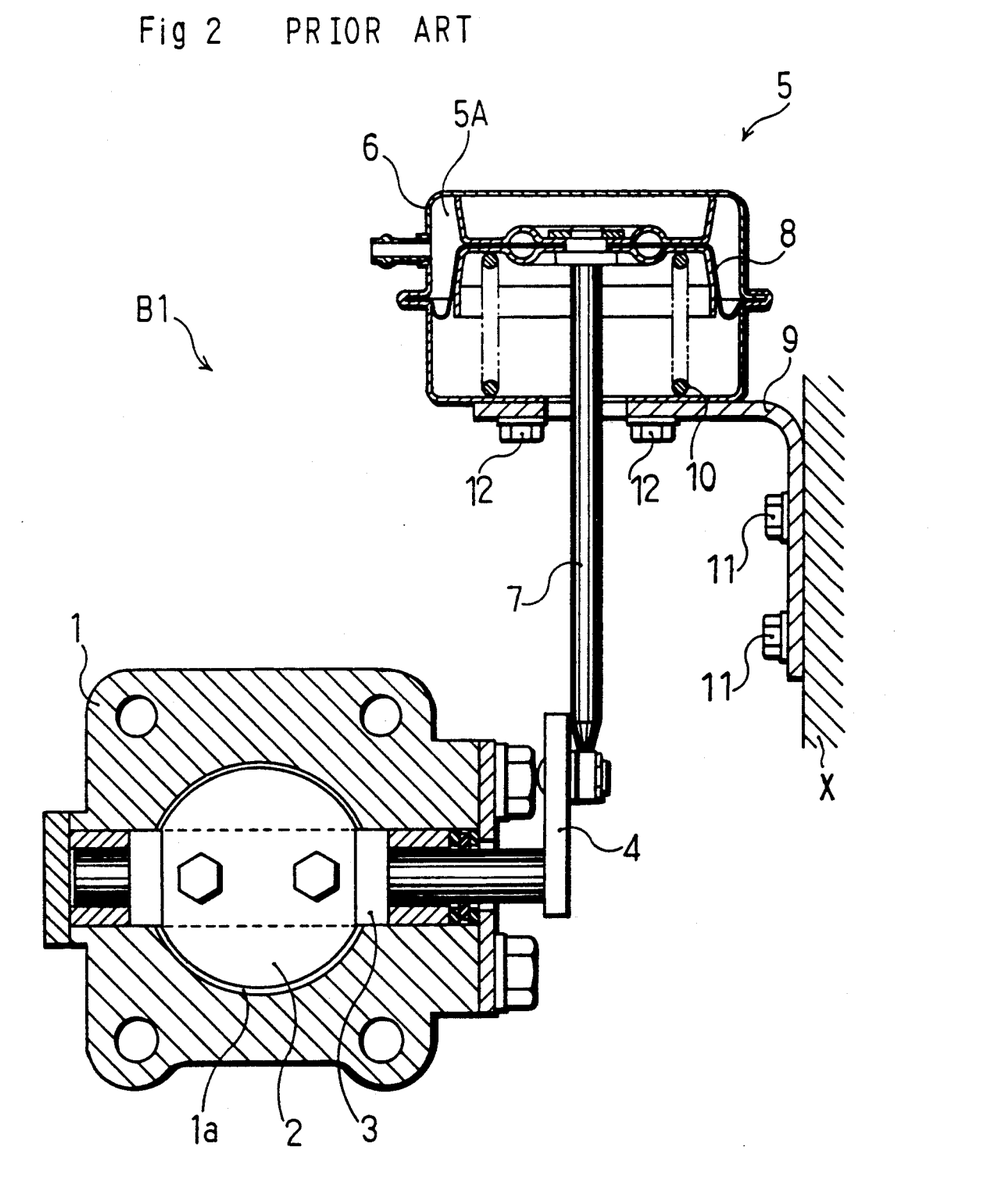
FIG. 2 is a section showing the improved example of the prior art.

Incidentally, another solution can be made by constructing the flow control valve, as shown in FIG. 2. In this flow control valve B1, the bracket 9 is fixed on a peripheral device X separate from the body 1 by making use of the bolts 11.

According to this structure, however, the assembling accuracy and performance of the flow control valve B1 are dropped. This is because the individual parts of the actuator 5 have to be fixed in different positions. Specifically, the rod 7 for actuating the valve member 2 is connected to the side of the body 1, whereas the bracket 9 for holding the casing 6 is connected to the peripheral device X.

In the structure according such solution, moreover, the flow control valve B1 has its vibration resistance dropped. Specifically, the portion of the exhaust pipe to be arranged with the body 1 and the portion of the peripheral device X to be arranged with the actuator 5 have different intrinsic numbers of vibrations. As a result, the connected portions of the arm 4 and the rod 7 are displaced after a long use. And, this displacement may possibly cause failures of the flow control valve B1.

SUMMARY OF THE INVENTION

An object of the present invention is to provide a flow control valve for an internal combustion engine, which is freed from inviting the reductions in the assembling performance and the vibration resistance.

Another object of the present invention is to provide a flow control valve for an internal combustion engine, which can prevent the heat of the body from being transferred to the diaphragm of the actuator even if the bracket is connected and fixed to the body.

Still another object of the present invention is to provide a flow control valve for an internal combustion engine, which can increase the degree of freedom of the arrangement of the bracket with respect to the body.

A further object of the present invention is to provide a flow control valve for an internal combustion engine, in which the body itself can be arranged even in the vicinity of the internal combustion engine to improve the degree of freedom of mounting the system itself on the internal combustion engine.

The above-specified objects can be achieved by a flow control valve for an internal combustion engine, a flow control valve for an internal combustion engine, which is to be arranged around said internal combustion engine, comprising; a body arranged in an exhaust pipe, said body including an exhaust passage and a valve member arranged in said exhaust passage; a diaphragm actuator for actuating said valve member; a bracket connected to said body, said bracket including an actuator mounting seat for supporting said diaphragm actuator and a body mounting seat connected to said body; said diaphragm actuator including a casing connected to the actuator mounting seat of said bracket, a diaphragm cased in said casing, and a rod protruding from said diaphragm out of said casing for actuating said valve member in accordance with the action of said diaphragm; and an insulating layer interposed between the actuator mounting seat of said bracket and the diaphragm of said diaphragm actuator.

The flow control valve according to the present invention can prevent the heat from being transferred to the diaphragm by the insulating layer even if the heat is transferred to the bracket.

DESCRIPTION OF THE PREFERRED EMBODIMENTS

The present invention will be described in the following in connection with one embodiment thereof with reference to the accompanying drawings. Incidentally, the present invention should not be restricted to the embodiments thereof, but all the modifications within the scope of the claims and their equivalents should be included in the scope of the claims.

Figure 3:
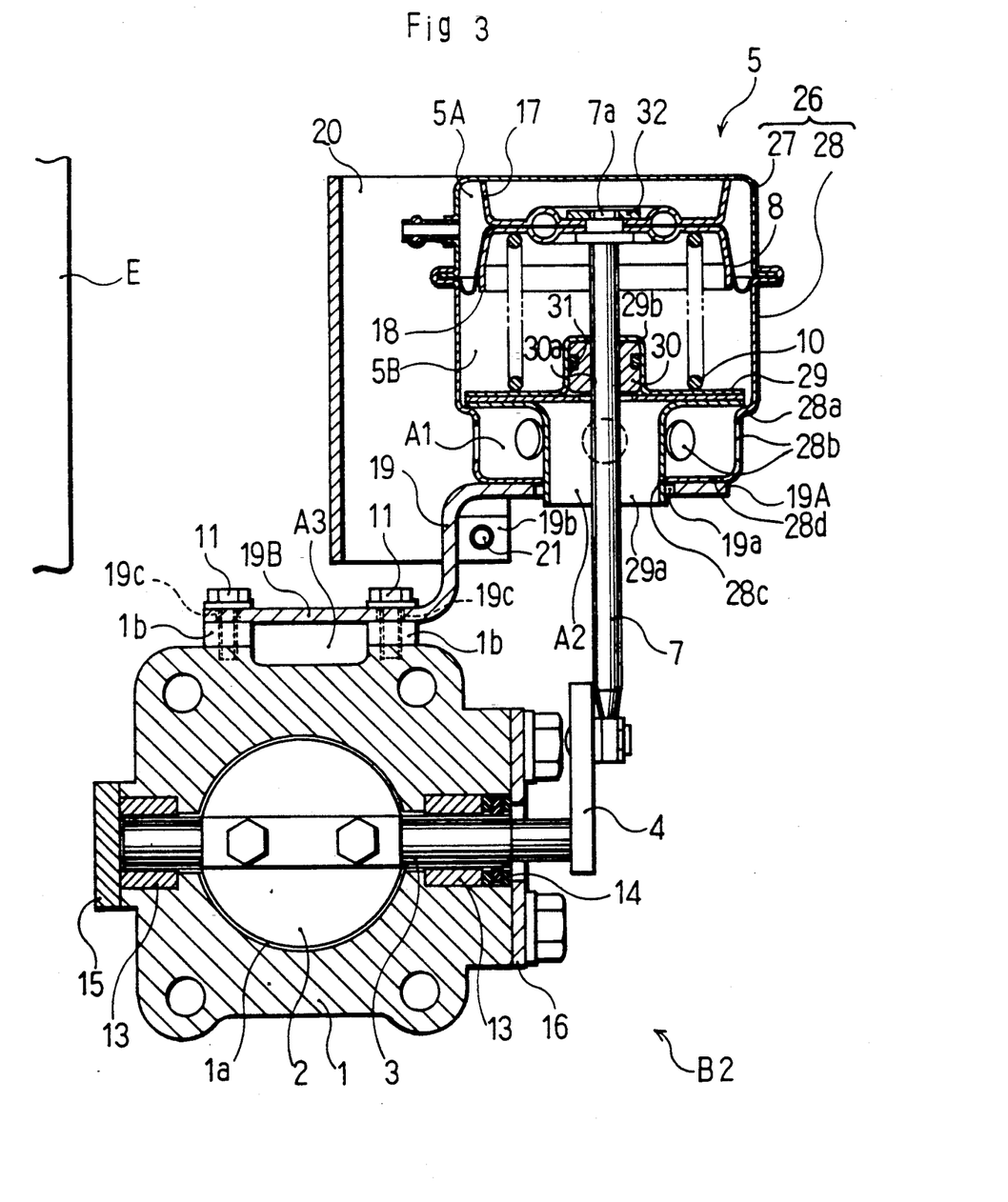
FIG. 3 is a section showing a first embodiment.
Figure 4:
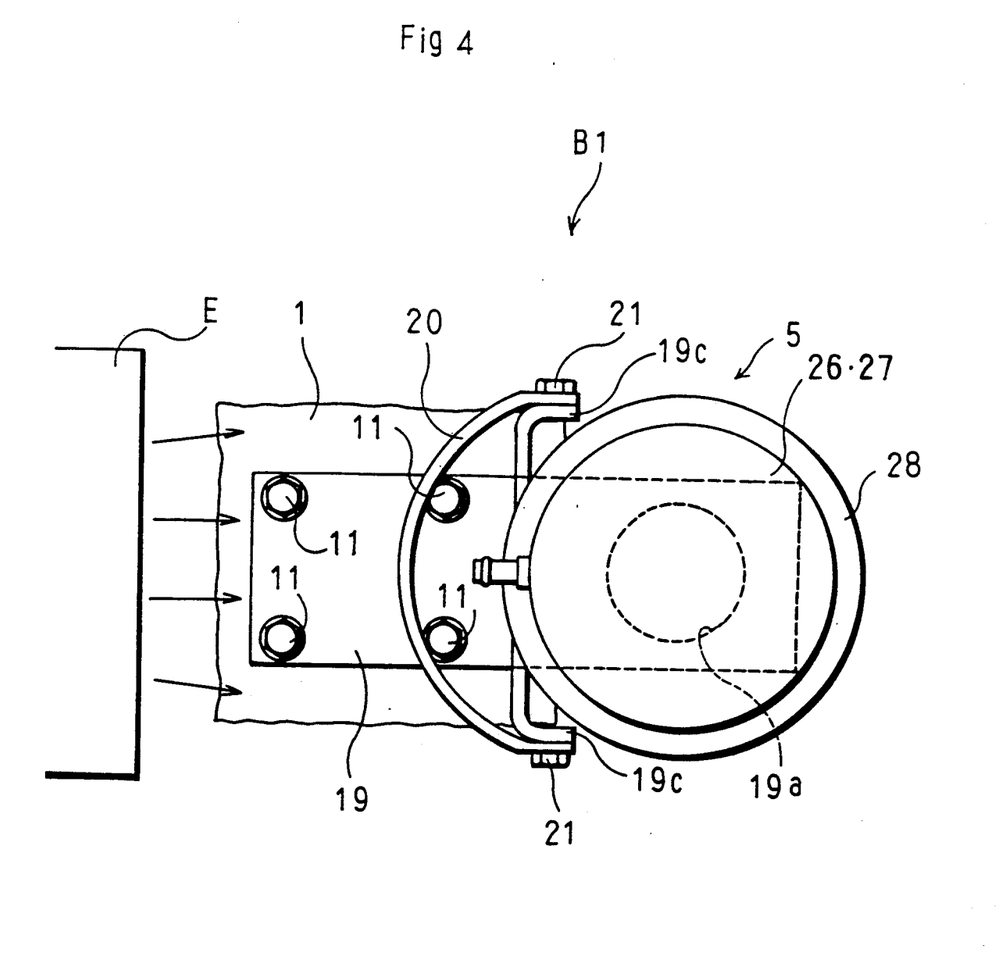
FIG. 4 is a top plan view showing a portion of the first embodiment.

A flow control valve B2 according to an embodiment shown in FIGS. 3 and 4 is equipped like the prior art with a body 1, an actuator 5 and a bracket 19.

A body 1 is arranged in the not-shown exhaust pipe. The body 1 is equipped with an exhaust passage 1a. A valve member 2 is arranged in the exhaust passage 1a. The body 1 supports the valve shaft 3 of the valve member 2. The valve shaft 3 has its one end connected to an arm 4. This arm 4 is connected to the rod 7 of the actuator 5 by making use of a pin (although not shown).

Incidentally, reference numeral 13 designates bearings for the valve shaft 3. Moreover, numeral 14 designates a sealing portion arranged with a seal ring or the like. Still moreover, numerals 15 and 16 designate cover plates which are fixed on the body 1.

The actuator 5 is equipped with a casing 26. A diaphragm 8 is arranged in the casing 26. This casing 26 is partitioned into two upper and lower chambers 5A and 5B by the diaphragm 8. The lower chamber 5B is arranged with a coil spring 10 for urging the diaphragm 8 upward. On the other hand, the lower chamber 5B is vented to the atmosphere. The upper chamber 5A is connected to the not-shown pressure source. This pressure source boosts the internal pressure of the upper chamber 5A when the not-shown accelerator pedal is depressed. And, the pressure source moves the rod 7 downward together with the diaphragm 8.

The casing 26 is equipped with an upper casing 27 and a lower casing 28 which are individually made of a stainless steel sheet or a steel sheet plated with a corrosion resisting metal.

The lower casing 28 has its lower portion equipped with a radially reduced stepped portion 28a and a bottom wall 28d. The circumferential wall of the lower casing 28 below the stepped portion 28a is formed with a plurality of vent holes 28b. Moreover, the lower casing 28 is arranged therein with an inner bottom wall 29 above the stepped portion 28a. This bottom wall 29 is composed of three plates. On the other hand, the bottom wall 29 supports the lower end of the coil spring 10.

Moreover, the space between the inner bottom wall and the outer bottom wall 28d provides an air layer or chamber A1 forming an insulating layer. This air layer A1 insulates the heat from a later-described bracket 19 so that the heat may not be transferred to the diaphragm 8 of the actuator 5.

A cylindrical portion 29a is formed below the bottom wall 29. The cylindrical portion 29a is formed at a gap around the rod 7. This cylindrical portion 29a has its lower end protruding downward from the bottom wall 28d of the lower casing 28.

A generally cylindrical housing portion 29b is formed above the bottom wall 29. The housing portion 29b houses a guide portion 30. This guide portion 30 guides the linear reciprocations of the rod 7.

The guide portion 30 is made of a material such as a fluorine resin. The guide portion 30 is formed at its center with a through hole 30a. This through hole 30a has its internal diameter substantially equalized to the external diameter of the rod 7 so that it can allow the rod 7 to slide on its inner circumference.

Incidentally, reference numeral 31 designates a packing for providing a sealing between the guide portion 30 and the housing portion 29b. Moreover, numerals 17 and 18 designate position regulating plates for regulating the position of the diaphragm 8. These position regulating plates 17 and 18 come into abutment against the lower face of the upper wall of the upper casing 27 and the upper face of the bottom wall 29 of the lower casing 28, respectively, when the diaphragm 8 moves upward and downward. Moreover, the position regulating plates 17 and 18 are integrated while clamping the diaphragm 8 inbetween. This integral mode is accomplished by screwing a nut 32 on the externally threaded portion 7a of the upper end of the rod 7.

And, the bracket 19 has its actuator mounting seat 19A connected to the lower face of the bottom wall 28d of the lower casing 28 of the actuator 5. The bracket 19 is used to support the actuator 5. The connection of the mounting seat 19A is accomplished by means of bolts or welding. The mounting seat 19A has an insertion hole 19a. In this insertion hole 19a, there is inserted the cylindrical portion 29a. This cylindrical portion 29a protrudes downward from the lower casing 28 of the actuator 5. Moreover, the insertion hole 19a inserts the cylindrical portion 29a therein at a gap.

The bracket 19 is made of a stainless steel sheet or a steel sheet plated with a corrosion resisting metal. The bracket 19 has its lower portion equipped with a body mounting seat 19B to be fixed to the body 1. This fixing of the mounting seat 19B to the body 1 is accomplished by making use of bolts 11.

Moreover, the bracket 19 is equipped with bent mounting seats 19b and 19b at the sides of the vertically extending portions. A cover 20 is held on the individual mounting seats 19b and 19b by means of bolts 21.

The cover 20 is made of a stainless steel sheet or a steel sheet plated with a corrosion resisting metal and is formed into a generally semicylindrical shape. The cover 20 is arranged at a gap from the actuator 5. The cover 20 covers around the actuator 5 only at the side of an internal combustion engine E.

In the flow control valve B2 according to this first embodiment, the connected portion of the actuator 5 to the bracket 19 is formed with the air layer A1. As a result, the heat from the bracket 19 is insulated by the air layer A1. Thus, the heat from the bracket 19 can be prevented from being transferred to the diaphragm 8 of the actuator 5.

In the flow control valve B2 of the first embodiment, moreover, the guide portion 30 made slidable on the rod 7 is arranged between the bottom wall 29 of the lower casing 28 and the rod 7. Specifically, the rod 7 moves to slide on the inner circumference of the through hole 30a of the guide portion 30 when the rod 7 performs its linear reciprocations. Thus, the rod 8 moves without any inclination. As a result, the duration of the diaphragm 8 can be prevented from being dropped by the movement of the rod 7.

In the flow control valve B2 of this first embodiment, moreover, the bottom wall 29 of the lower casing 28 is formed with the cylindrical portion 29a extending downward. This cylindrical portion 29a is arranged at a gap between itself and the rod 7. Moreover, the cylindrical portion 29a protrudes at a gap from the insertion hole 19a of the bracket 19. In other words, an air layer A2 for shielding the rod 7 is formed by the cylindrical portion 29a between the inner circumference of the insertion hole 19a of the bracket 19 and the rod 7. Thus, the heat from the bracket 19 (i.e., the upper mounting seat 19A) is hardly transferred to the rod 7. As a result, the flow control valve B2 of the first embodiment is more reluctant to transfer the heat from the bracket 19 to the diaphragm 8.

Incidentally, due to the air layer A2, the heat from the bracket 19 is hard to transfer to the rod 7. As a result, the heat resistance of the guide portion 30 need not be considered so much. In other words, the degree of freedom for selecting the material for the guide portion 30 is greater. Moreover, the guide portion 30 is hardly worn by the sliding rod 7. As a result, it is more possible to prevent the rod 7 from falling down.

In the flow control valve B2 of this first embodiment, still moreover, the cover 20 covers around the actuator 5 at the side of the internal combustion engine E. In other words, the radiant heat of the internal combustion engine E is insulated by the cover 20. As a result, the radiant heat of the internal combustion engine E can be prevented from being transferred to the actuator 5. On the other hand, the cover 20 covers the actuator 5 only at the side of the internal combustion engine E. In other words, the opposed side of the actuator 5 to the internal combustion engine E is not shielded by the cover 20. As a result, the actuator 5 can be cooled down. This is because the actuator 5 can be exposed to the air flow.

In the flow control valve B2 of the first embodiment, furthermore, the body 1 is formed with bosses 1b for screwing the bolts 11 in the vicinity of the individual bolt receiving holes 19c of the lower mounting seat 19B of the bracket 19. In short, an insulating air layer A3 is formed by the bosses 1b. Moreover, the bracket 19 is held to contact partially with the body 1 by the bosses 1b. Thanks to the air layer A3 and the small contact area, the heat of the body 1 is hard to transfer so that it can exert less influences upon the diaphragm 8.

Figure 5:
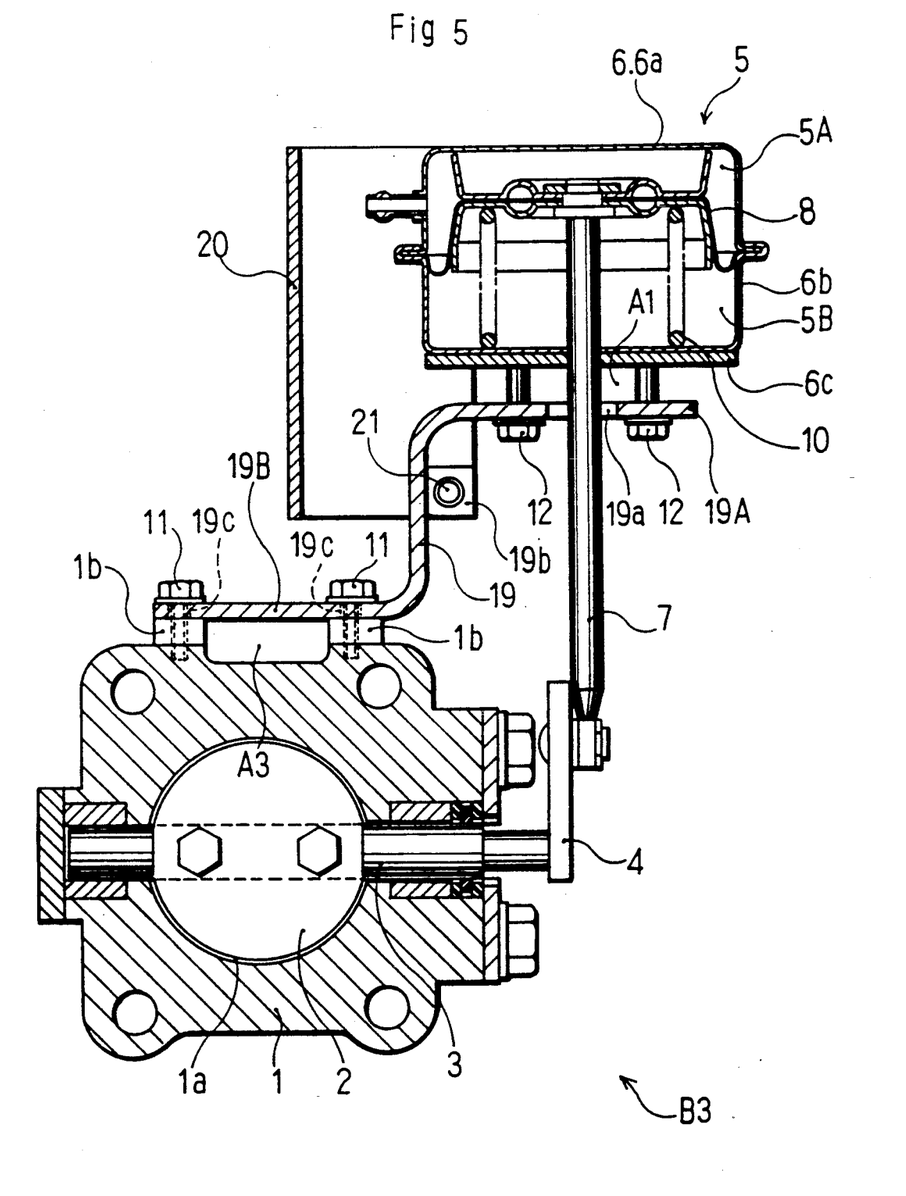
FIG. 5 is a section showing a second embodiment.

In the flow control valve B3 of this second embodiment, the casing 6 of the actuator 5 is composed of an upper casing 6a and a lower casing 6b. The upper casing 6a covers around the upper chamber 5A, and the lower casing 6b covers around the lower chamber 5B. Moreover, a mounting plate 6c is fixed on the lower face of the lower casing 6b.

To the mounting plate 6c, moreover, there is fixed at a space the upper mounting seat 19A of the bracket 19. This fixing is accomplished by making use of bolts 12.

In this flow control valve B3 of the second embodiment, the air layer A1 acting as the insulating layer is formed between the mounting plate 6c and the upper mounting seat 19A. Due to the air layer Al, moreover, the heat of the bracket 19 is hard to transmit to the diaphragm 8.

Figure 6:
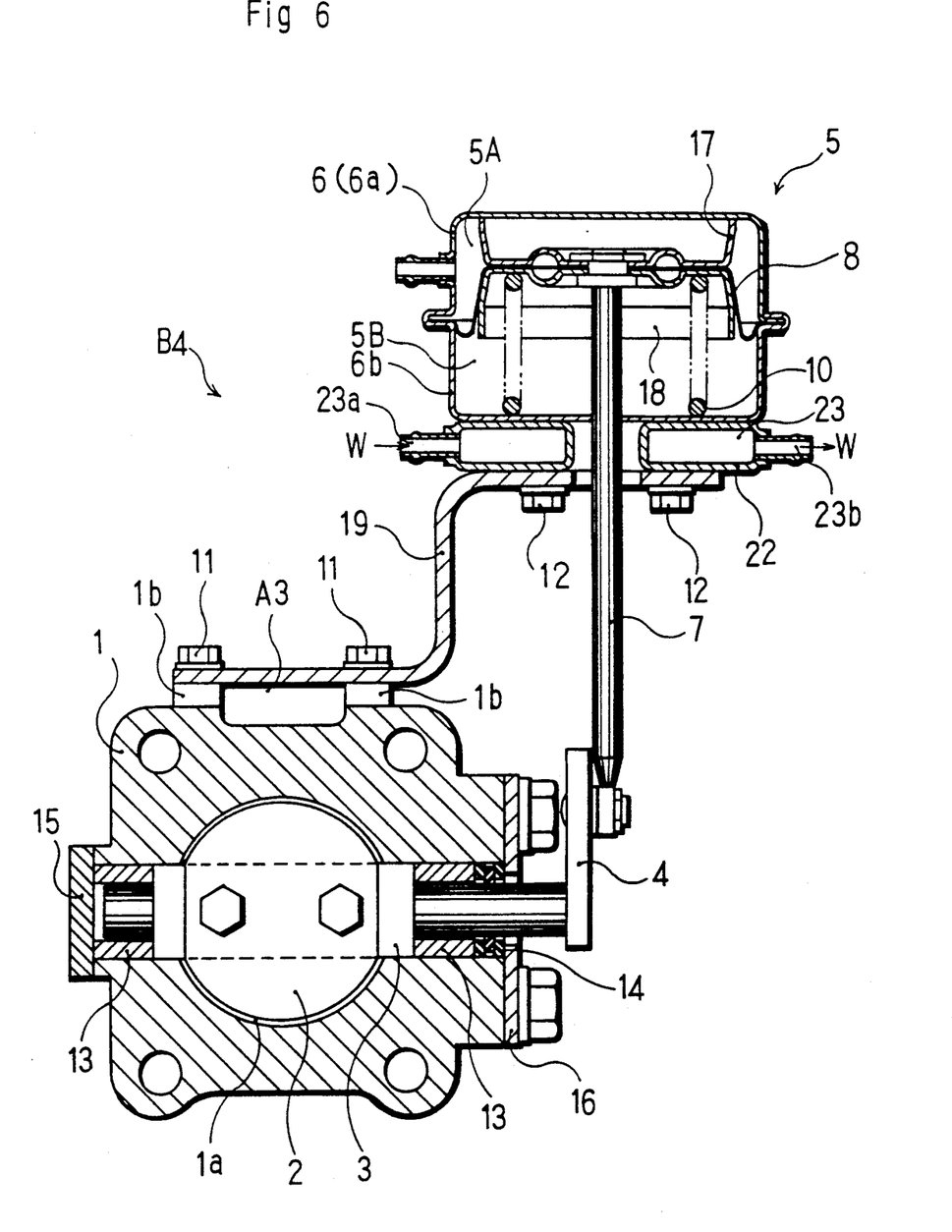
FIG. 6 is a section showing a third embodiment.

Next, a flow control valve B4 according to a third embodiment will be described in the following with reference to FIG. 6.

In this flow control valve B4 of the third embodiment, a cooling water passage 23 forming an insulating layer is formed between the actuator mounting seat 19A of the bracket 19 and the lower casing 6b of the actuator 5.

This cooling water passage 23 is defined by an annular outer wall 22. This outer wall 22 is fixed to the lower face of the lower casing 6b. Moreover, the cooling water passage 23 is formed with an entrance 23a and an exit 3b at predetermined positions. These entrance 23a and exit 3b are connected with a not-shown radiator. And, this cooling water passage 23 allows cooling water W from the not-shown radiator to flow therethrough.

In this flow control valve B4 of the third embodiment, the cooling water passage 23 makes it hard to transfer the heat from the bracket 19 to the diaphragm 8.

Figure 7:
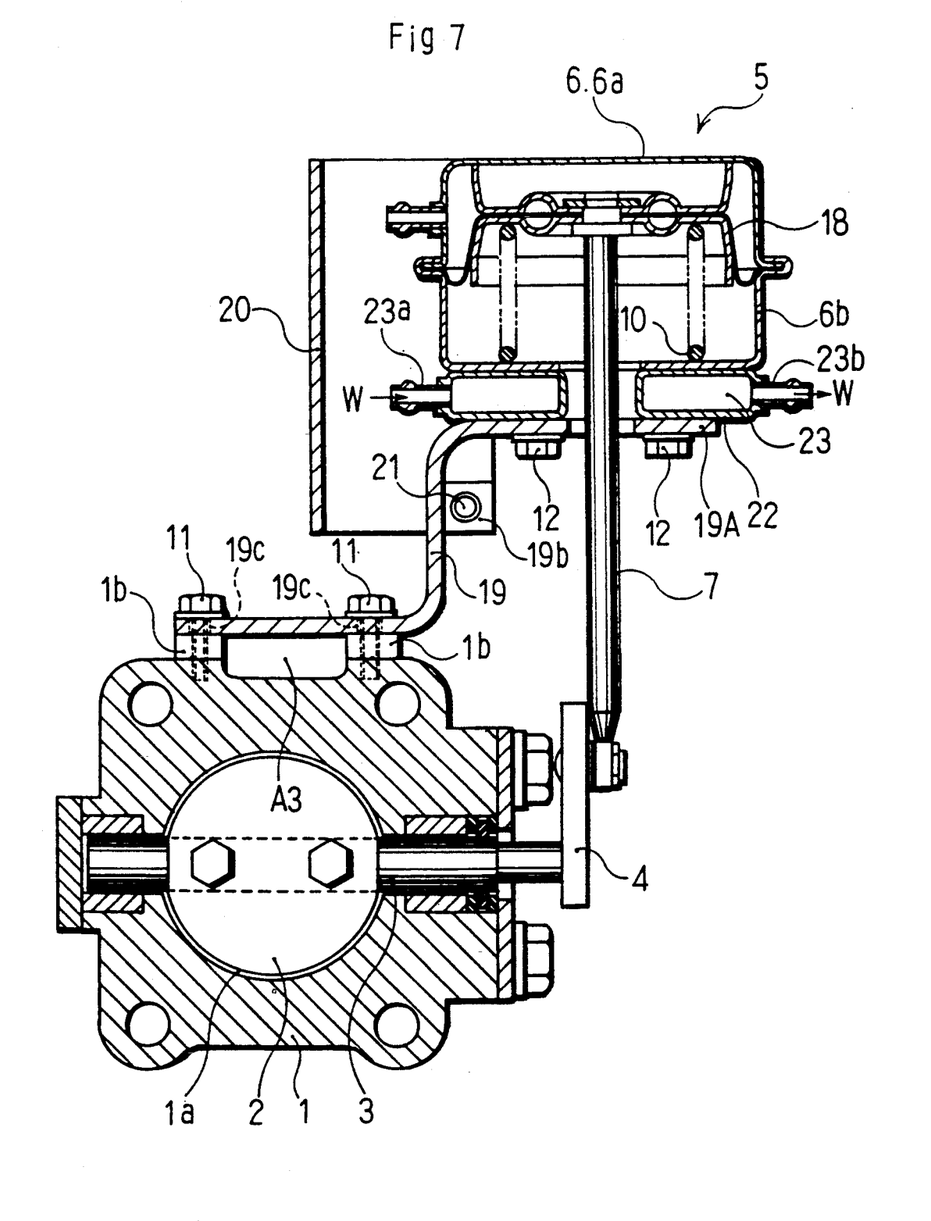
FIG. 7 shows a modification of the third embodiment.

Incidentally, this flow control valve B4 of the third embodiment may also be equipped with the cover 20, as shown in FIG. 7, like the first and second embodiments.

Figure 8:
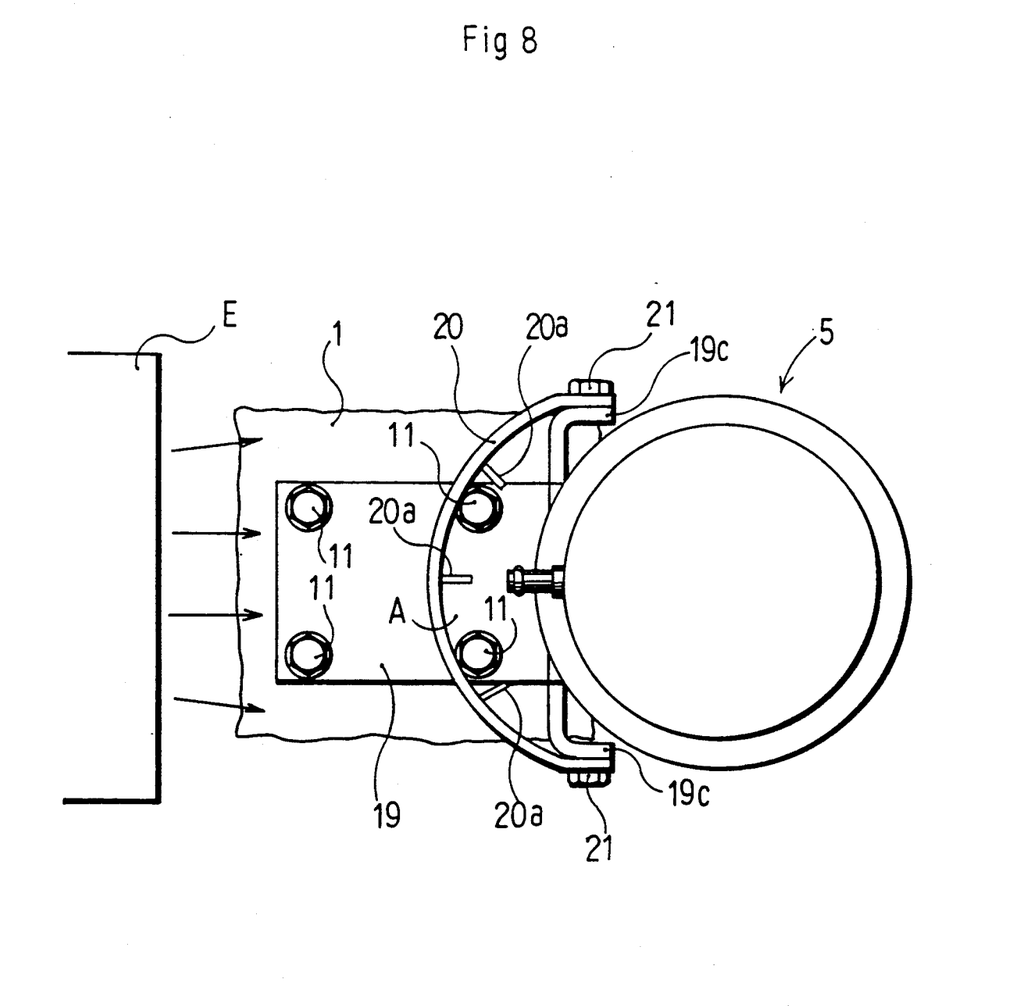
FIG. 8 shows a modification of the cover member.

Moreover, the cover 20 to be used in the first to third embodiments may be modified, as shown in FIG. 8. This modified cover 20 is formed with a plurality of fins 20a. Due to the fins 20a, the cover 20 can dissipate the radiant heat coming from the internal combustion engine E.

Still moreover, the bracket 19 to be used in the first to third embodiments may be modified to have the radiating effect. In this modification, the bracket 19 may be formed with additional recessed or ridged portions so as to increase the surface area.

Figure 9:
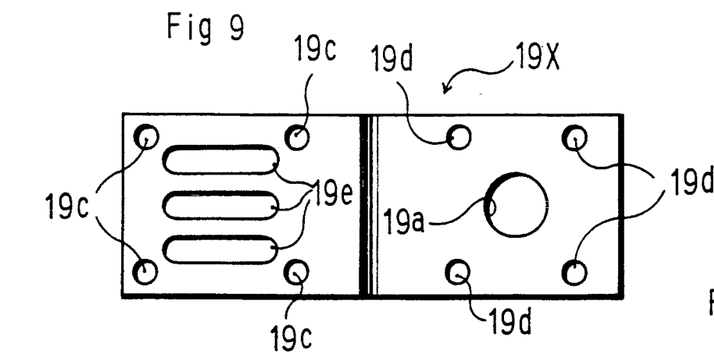
FIG. 9 is a top plan view showing a modification of the bracket.
Figure 10:
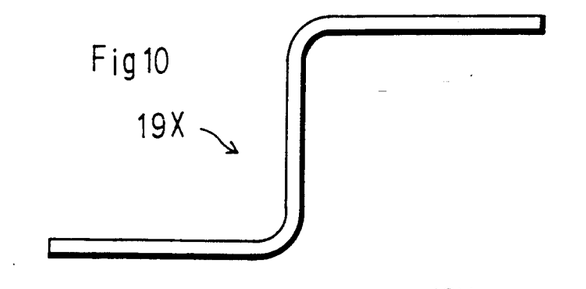
FIG. 10 is a front elevation showing the bracket shown in FIG. 9.
Figure 11:
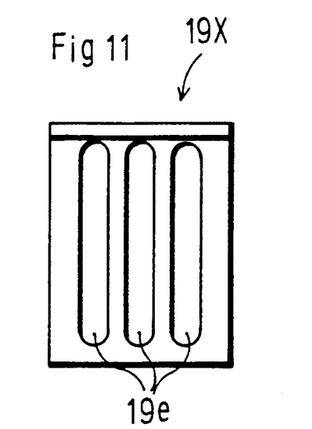
FIG. 11 is a righthand side elevation showing the bracket shown in FIG. 9.

The recessed additional portions are exemplified at first by a bracket 19X, as shown in FIGS. 9 to 11. This bracket 19X is formed with a plurality of through holes 19e. Incidentally, the reference numeral 19a designates the insertion hole for inserting the rod 7 of the actuator 5. On the other hand, the numeral 19c designates mounting holes for the bolts 11. Moreover, numeral 19d designates insertion holes for the bolts 12.

Figure 12:
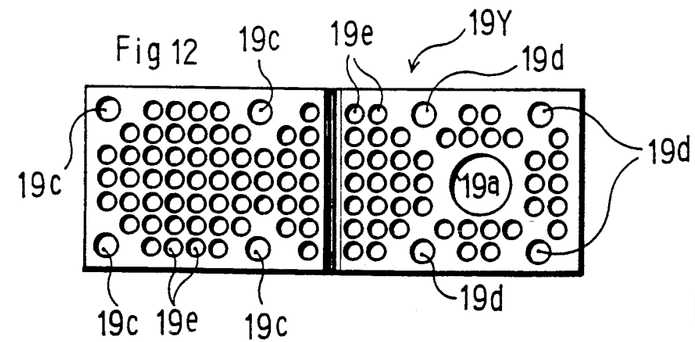
FIG. 12 is a top plan view showing another modification of the bracket.
Figure 13:
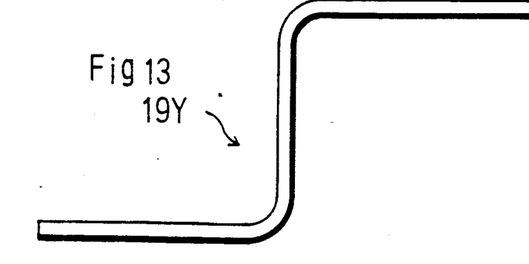
FIG. 13 is a front elevation showing the bracket shown in FIG. 12.
Figure 14:
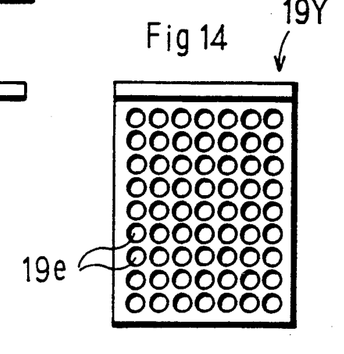
FIG. 14 is a righthand side elevation showing the bracket shown in FIG. 12.

On the other hand, the recessed additional portions are also exemplified by a bracket 19Y, as shown in FIGS. 12 to 14. This bracket 19Y is formed with more through holes 19e than the bracket 19X.

Figure 15:
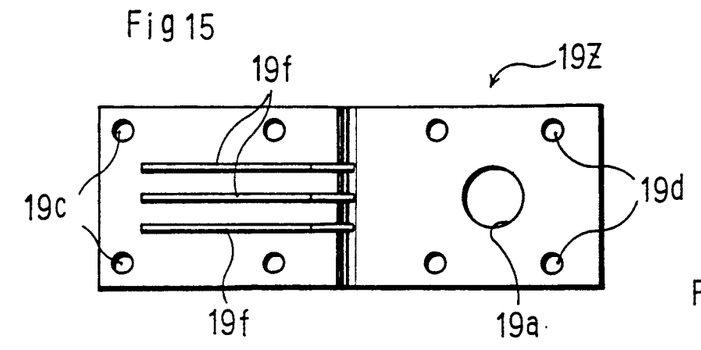
FIG. 15 is a top plan view showing still another modification of the bracket.
Figure 16:
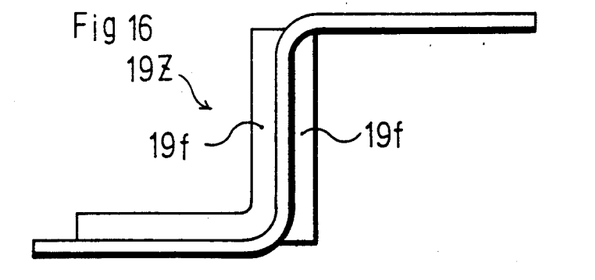
FIG. 16 is a front elevation showing the bracket shown in FIG. 15.
Figure 17:
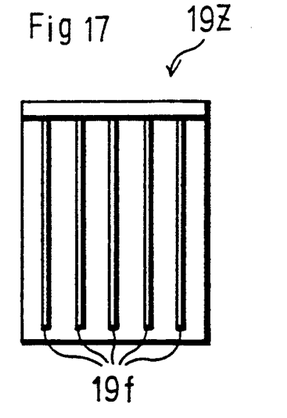
FIG. 17 is a righthand side elevation showing the bracket shown in FIG. 15.

Moreover, the ridged additional portions are exemplified by a bracket 19Z, as shown in FIGS. 15 to 17. This bracket 19Z is formed with a plurality of fins 19f.

These brackets 19X, 19Y and 19Z are enabled to reduce the influences of the heat upon the diaphragm 8 by the radiating effect.

What is claimed is:

1. An exhaust gas flow control valve for an internal combustion engine which is to be disposed in an exhaust pipe of the engine, comprising:
   (a) a valve body disposed in an engine exhaust pipe and including an exhaust passage and a valve disposed in said exhaust passage;
   (b) a diaphragm actuator for actuating said valve member and including a casing having an upper chamber and a lower chamber separated by a diaphragm;
   (c) an actuator rod connected at an upper end thereof to the diaphragm and having a lower end thereof extending outside said casing and connected to a valve moving means;
   (d) said casing also including an insulating chamber disposed below and connected to said lower compartment and having a centrally disposed cylindrical portion surrounding a portion of said actuator rod for reducing the heat transferred by said rod from the valve body to the diaphragm actuator; and
   (e) a bracket connected to said valve body by means of a first valve body mounting seat and connected by means of a second actuator mounting seat to said insulating chamber whereby heat conducted from the valve body to the diaphragm actuator is reduced.

2. An exhaust gas flow control valve for an internal combustion engine according to 1, wherein
   said casing has an inner bottom wall and an outer bottom wall, the latter of which is connected to said actuator mounting seat of said bracket, and said insulating chamber comprises an air layer between the two bottom walls of said casing.

3. An exhaust gas flow control valve for an internal combustion engine according to claim 1, wherein a cover member is connected to and fixed to said bracket, and
   said cover member covers said diaphragm actuator only at the side thereof facing an internal combustion engine while having a gap between itself and said diaphragm actuator.

4. An exhaust gas flow control valve for an internal combustion engine according to claim 3,
   wherein said cover member has a plurality of fins.

5. An exhaust gas flow control valve for an internal combustion engine according to claim 1,
   wherein a plurality of bosses protruding from said body for fixing the body mounting seat of said bracket, and
said plural bosses are in contact with the body mounting seat of said bracket partially.

6. An exhaust gas flow control valve for an internal combustion engine according to claim 1, wherein a guide portion made slidable on said rod is interposed between said casing and said rod within said lower chamber and above said insulating chamber.

7. An exhaust gas flow control valve for an internal combustion engine according to claim 1,
   wherein said insulating layer is an air layer interposed between the actuator mounting seat of said bracket and the casing of said diaphragm actuator.

8. An exhaust gas flow control valve for an internal combustion engine which is to be disposed in an exhaust pipe of the engine, comprising:
   (a) a valve body disposed in an engine exhaust pipe and including an exhaust passage and a valve disposed in said exhaust passage;
   (b) a diaphragm actuator for actuating said valve member and including a casing separated by a diaphragm;
   (c) an actuator rod connected at an upper end thereof to the diaphragm and having a lower end thereof extending outside said casing and connected to a valve moving means;
   (d) said casing also including an insulating chamber disposed below and connected to said lower compartment and having a centrally disposed cylindrical portion surrounding a portion of said actuator rod for reducing the heat transferred by said rod from the valve body to the diaphragm actuator; and
   (e) a bracket connected to said valve body by means of a first valve body mounting seat and connected by means of a second, actuator mounting seat to said insulating chamber whereby heat conducted from the valve body to the diaphragm actuator is reduced;
   (f) wherein said casing has an inner bottom wall and an outer bottom wall, the outer bottom wall being connected to said actuator mounting seat of said bracket, and said insulating chamber comprises an air layer between the two bottom walls of said casing; and
   (g) wherein said inner bottom wall has a cylindrical portion extending around said rod while leaving a space between itself and said rod;
   (h) said cylindrical portion extends through said outer bottom wall and protrudes from the actuator mounting seat of said bracket while leaving a space in between; and
   (i) the space between said cylindrical portion of said rod functions as a second insulating air layer.

* * * * *